(12) United States Patent
Herle et al.

(10) Patent No.: US 12,021,219 B2
(45) Date of Patent: Jun. 25, 2024

(54) PRETREATMENT AND POST-TREATMENT OF ELECTRODE SURFACES

(71) Applicant: Applied Materials, Inc., Santa Clara, CA (US)

(72) Inventors: Subramanya P. Herle, Mountain View, CA (US); Girish Kumar Gopalakrishnan Nair, San Jose, CA (US); Daniel Stock, Alzenau (DE); Sambhu Kundu, Fremont, CA (US); Ezhiylmurugan Rangasamy, Oakland, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/658,347

(22) Filed: Apr. 7, 2022

(65) Prior Publication Data

US 2022/0328803 A1    Oct. 13, 2022

Related U.S. Application Data

(60) Provisional application No. 63/173,181, filed on Apr. 9, 2021, provisional application No. 63/191,114, filed on May 20, 2021.

(51) Int. Cl.
*H01M 4/04* (2006.01)
*H01M 4/1395* (2010.01)
(Continued)

(52) U.S. Cl.
CPC ....... *H01M 4/0492* (2013.01); *H01M 4/0404* (2013.01); *H01M 4/1395* (2013.01);
(Continued)

(58) Field of Classification Search
CPC ............ H01M 4/0492; H01M 4/0404; H01M 4/1395; H01M 4/382; B05D 5/12; B05D 3/142; B05D 3/044
(Continued)

(56) References Cited

U.S. PATENT DOCUMENTS 6,441,553 B1   8/2002   Yializis et al.
6,887,511 B1   5/2005   Shima et al.
(Continued)

FOREIGN PATENT DOCUMENTS

CN    109830689 A  *  5/2019
EP       1953852 A1     8/2008
(Continued)

OTHER PUBLICATIONS

International Search Report and Written Opinion for International Application No. PCT/US2022/023774 dated Jul. 26, 2022.
(Continued)

*Primary Examiner* — Brian K Talbot
(74) *Attorney, Agent, or Firm* — Patterson + Sheridan, LLP

(57) ABSTRACT

A method and apparatus for fabricating electrodes used in energy storage devices are provided. In some implementations a surface of the electrode is activated for (a) a pre-treatment process to remove loosely held particles from the electrode surface; (b) a pre-treatment process to activate the surface of the electrode material for improved bonding or wetting for subsequently deposited materials; (c) a post-treatment of the pre-lithiation layer to improve subsequent bonding with additionally deposited layer, for example, passivation layers; and/or (d) a post-treatment of the pre-lithiation layer to improve/accelerate absorption of the lithium into the underlying electrode material.

20 Claims, 3 Drawing Sheets

(51) Int. Cl.
*H01M 4/38* (2006.01)
*B05D 3/04* (2006.01)
*B05D 3/14* (2006.01)
*B05D 5/12* (2006.01)

(52) U.S. Cl.
CPC ............ *H01M 4/382* (2013.01); *B05D 3/044* (2013.01); *B05D 3/142* (2013.01); *B05D 5/12* (2013.01)

(58) Field of Classification Search
USPC ............................... 427/532–535, 98.6, 99.2
See application file for complete search history.

(56) References Cited

U.S. PATENT DOCUMENTS

| | | | |
|---|---|---|---|
| 8,460,603 | B2 | 6/2013 | Shigyo et al. |
| 8,906,576 | B2 | 12/2014 | Darby et al. |
| 9,508,976 | B2 | 11/2016 | Herle |
| 10,033,023 | B2 | 7/2018 | Gotlib Vainshtein et al. |
| 10,411,238 | B2 | 9/2019 | Herle |
| 10,903,468 | B2 | 1/2021 | Kim et al. |
| 2002/0182488 | A1* | 12/2002 | Cho ................ H01M 10/052 429/231.95 |
| 2008/0000497 | A1 | 1/2008 | Verhaverbeke |
| 2010/0120179 | A1* | 5/2010 | Zhamu ................ H01M 4/625 257/E21.001 |
| 2010/0275950 | A1 | 11/2010 | Mack et al. |
| 2012/0129051 | A1 | 5/2012 | Wang et al. |
| 2013/0295407 | A1 | 11/2013 | Obata et al. |
| 2019/0044137 | A1* | 2/2019 | Zhamu ................ H01M 4/134 |
| 2019/0058177 | A1* | 2/2019 | Herle .................. H01G 11/84 |
| 2019/0237758 | A1 | 8/2019 | Dadheech et al. |
| 2019/0296386 | A1 | 9/2019 | Chen |
| 2019/0305377 | A1 | 10/2019 | Keates |
| 2019/0319255 | A1* | 10/2019 | Youn .................. H01M 4/662 |
| 2020/0091511 | A1 | 3/2020 | Park et al. |
| 2020/0303728 | A1* | 9/2020 | Kim .................. H01M 4/1391 |
| 2020/0343533 | A1* | 10/2020 | Herle ................ H01M 4/382 |
| 2021/0359339 | A1* | 11/2021 | Lou .................. H01M 4/1391 |
| 2022/0052307 | A1* | 2/2022 | Rangasamy ........ H01M 4/1393 |
| 2023/0373796 | A1* | 11/2023 | Costantino ............ H01M 4/386 |

FOREIGN PATENT DOCUMENTS

| | | |
|---|---|---|
| EP | 2626936 A1 | 8/2013 |
| GB | 2417608 A | 3/2006 |
| JP | 2006079935 A | 3/2006 |
| WO | 2017001643 A1 | 1/2017 |

OTHER PUBLICATIONS

Mach, et al., Thermal Plasma Treatment of Graphite Powders—Modification of the Surface, Federal Institute for Materials Research and Testing, Unter den Eichen 87, D-12205 Berlin, Germany, 2007, 5 pages.

* cited by examiner

PRETREATMENT AND POST-TREATMENT OF ELECTRODE SURFACES

CROSS-REFERENCE TO RELATED APPLICATIONS

This application claims benefit of U.S. Provisional Patent Application No. 63/173,181, filed Apr. 9, 2021, and Application No. 63/191,114, filed May 20, 2021, which are herein incorporated by reference in their entirety.

BACKGROUND

Field

The present disclosure generally relates to energy storage devices and methods for fabricating electrodes used in energy storage devices.

Description of the Related Art

In the energy storage device industry, energy storage devices are typically fabricated by a number of manufacturing processes. Some manufacturing processes may generate particles, which frequently contaminate the surfaces of the electrode that is being processed. For example, some processes include an atmospheric process performed in a non-clean room environment followed by a process performed in a vacuum environment. Non-clean room processes often produce contaminants such as dust, which adversely affect the subsequent vacuum process. In addition, static charge present on the substrate or web can attract additional dust and particulates. These contaminants can reduce surface activation of the electrode, which can make bonding of subsequent materials difficult. However, removal of the contaminant particles, e.g., dust particles, residual carbon, organic contaminant particles, or other contaminants is rather challenging.

Thus, there is a need for systems and methods for removing contaminants from electrode surfaces.

SUMMARY

The present disclosure generally relates to energy storage devices and methods for fabricating electrodes used in energy storage devices.

In one aspect, a method of forming an electrode structure is provided. The method includes exposing the electrode structure to a surface treatment process to activate a surface of the electrode structure. The method further includes forming a lithium metal film on the electrode structure. The surface treatment process is selected from a corona treatment process, an atmospheric plasma treatment process, a low energy plasma treatment process, a plasma treatment process performed in a vacuum environment, or a combination thereof.

Implementations may include one or more of the following. The surface treatment process is the corona treatment process. The corona treatment process includes generating an ionized corona discharge plasma. The generated corona discharge plasma includes a positive or negatively charged plasma. The surface treatment process is the atmospheric plasma treatment process. The atmospheric plasma treatment process is performed at or near atmospheric pressure. The atmospheric plasma treatment process includes a plasma source gas comprising a chemically reactive species and a chemically non-reactive species. The chemically reactive species is selected from oxygen, nitrogen, hydrogen, or a combination thereof. The chemically non-reactive species is selected from argon, helium, or a combination thereof. The plasma source gas includes a concentration of at least 95% of the chemically non-reactive species and a concentration of the chemically reactive species of less than 5%. The chemically reactive species is oxygen and the chemically non-reactive species is argon. The chemically reactive species is hydrogen and the chemically non-reactive species is argon. The atmospheric plasma treatment process includes generating an atmospheric pressure plasma using an RF frequency power source. The RF frequency power source is from about 13.56 MHz to about 27 MHz. The surface treatment process is the plasma treatment process performed in a vacuum environment. The plasma treatment process includes exposing the electrode structure to a reducing plasma. The reducing plasma is formed from a reducing gas mixture comprising ammonia ($NH_3$), hydrazine ($N_2H_4$), hydrogen ($H_2$), hydrogen halides, hydrogen chalcogenides, atomic hydrogen, radicals thereof, derivatives thereof, or a combination thereof. The reducing gas mixture further includes one or more inert gases. The reducing plasma is a remotely formed plasma, a capacitively coupled plasma, or an inductively coupled plasma. The plasma treatment process includes exposing the electrode structure to an oxidizing plasma. The oxidizing plasma is formed from an oxidizing gas mixture includes oxygen ($O_2$), ozone ($O_3$), nitrous oxide ($N_2O$), fluorine ($F_2$), chlorine ($Cl_2$), carbon monoxide (CO), water ($H_2O$), carbon dioxide ($CO_2$), radicals thereof, derivatives thereof, or a combination thereof. The oxidizing gas mixture further includes one or more inert gases. The oxidizing plasma is a remotely formed plasma, a capacitively coupled plasma, or an inductively coupled plasma. The electrode structure is a composite anode comprising at least one of carbon, graphite, silicon, silicon oxide, silicon-containing graphite, lithium, lithium metal foil or a lithium alloy foil (e.g. lithium aluminum alloys), nickel, copper, silver, tin, indium, silicon, oxides thereof, composites thereof, or combinations thereof and a binder material. The electrode structure further comprises a continuous flexible substrate. The surface treatment process is performed in a roll-to-roll tool. The lithium metal film is exposed to $CO_2$ gas to form a passivation layer.

In another aspect, a method of forming an electrode structure is provided. The method includes forming an anode structure in an atmospheric environment. The method further includes exposing the anode structure to a surface treatment process to activate a surface of the electrode structure. The method further includes forming a lithium metal film on the electrode structure in a vacuum environment. The surface treatment process is selected from a corona treatment process, an atmospheric plasma treatment process, a low energy plasma treatment process, a plasma treatment process performed in a vacuum environment, or a combination thereof. The electrode structure further comprises a continuous flexible substrate.

Implementations may include one or more of the following. The surface treatment process is the corona treatment process. The corona treatment process includes generating an ionized corona discharge plasma. The generated corona discharge plasma includes a positive or negatively charged plasma. The surface treatment process is the atmospheric plasma treatment process. The atmospheric plasma treatment process is performed at or near atmospheric pressure. The atmospheric plasma treatment process includes a plasma source gas comprising a chemically reactive species and a chemically non-reactive species. The chemically reactive species is selected from oxygen, nitrogen, hydrogen, or a combination thereof. The chemically non-reactive species is selected from argon, helium, or a combination thereof. The plasma source gas includes a concentration of at least 95% of the chemically non-reactive species and a concentration of the chemically reactive species of less than 5%. The chemically reactive species is oxygen and the chemically non-reactive species is argon. The chemically reactive species is hydrogen and the chemically non-reactive species is argon. The atmospheric plasma treatment process includes generating an atmospheric pressure plasma using an RF frequency power source. The RF frequency power source is from about 13.56 MHz to about 27 MHz. The surface treatment process is the plasma treatment process performed in a vacuum environment. The plasma treatment process includes exposing the electrode structure to a reducing plasma. The reducing plasma is formed from a reducing gas mixture comprising ammonia ($NH_3$), hydrazine ($N_2H_4$), hydrogen ($H_2$), hydrogen halides, hydrogen chalcogenides, atomic hydrogen, radicals thereof, derivatives thereof, or a combination thereof. The reducing gas mixture further includes one or more inert gases. The reducing plasma is a remotely formed plasma, a capacitively coupled plasma, or an inductively coupled plasma. The plasma treatment process includes exposing the electrode structure to an oxidizing plasma. The oxidizing plasma is formed from an oxidizing gas mixture includes oxygen ($O_2$), ozone ($O_3$), nitrous oxide ($N_2O$), fluorine ($F_2$), chlorine ($Cl_2$), carbon monoxide (CO), water ($H_2O$), carbon dioxide ($CO_2$), radicals thereof, derivatives thereof, or a combination thereof. The oxidizing gas mixture further includes one or more inert gases. The oxidizing plasma is a remotely formed plasma, a capacitively coupled plasma, or an inductively coupled plasma. The electrode structure is a composite anode comprising at least one of carbon, graphite, silicon, silicon oxide, silicon-containing graphite, lithium, lithium metal foil or a lithium alloy foil (e.g. lithium aluminum alloys), nickel, copper, silver, tin, indium, silicon, oxides thereof, composites thereof, or combinations thereof and a binder material. The electrode structure further comprises a continuous flexible substrate. The surface treatment process is performed in a roll-to-roll tool. The lithium metal film is exposed to $CO_2$ gas to form a passivation layer.

In another aspect, a non-transitory computer readable medium has stored thereon instructions, which, when executed by a processor, causes the process to perform operations of the above apparatus and/or method.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

So that the manner in which the above recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1A:
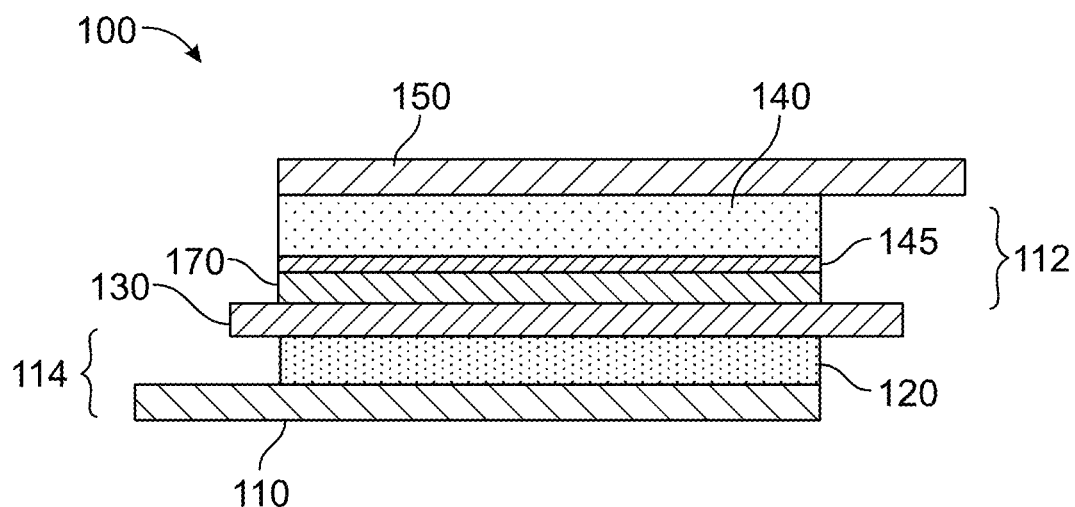
FIG. 1A illustrates a cross-sectional view of one example of a battery structure incorporating an electrode structure formed according to one or more implementations described herein.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes electrode structures, high performance electrochemical cells and batteries including the aforementioned electrode structures, and methods for fabricating the same. Certain details are set forth in the following description and in FIGS. 1A-5B to provide a thorough understanding of various implementations of the disclosure. Other details describing well-known structures and systems often associated with electrochemical cells and batteries are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a roll-to-roll coating system, such as TopMet™, SmartWeb™, TopBeam™, all of which are available from Applied Materials, Inc. of Santa Clara, California Other tools capable of performing high rate evaporation processes may also be adapted to benefit from the implementations described herein. In addition, any system enabling high rate evaporation processes described herein can be used to advantage. The apparatus description described herein is illustrative and should not be construed or interpreted as limiting the scope of the implementations described herein. It should also be understood that although described as a roll-to-roll process, the implementations described herein may also be performed on discrete substrates.

Some implementations described herein will be described below in reference to a roll-to-roll coating system. The apparatus description described herein is illustrative and should not be construed or interpreted as limiting the scope of the implementations described herein. It should also be understood that although described as a roll-to-roll process, the implementations described herein can be performed on other types of substrates, for example, discrete substrates.

Some implementations described herein refer to a coating system adapted for pre-lithiation of a flexible substrate such as a web for lithium-ion battery devices. In particular, the coating system is adapted for continuous processing of a flexible substrate such as a web unwound from an unwinding module. The coating system can be configured in a modular design, for example, an appropriate number of process modules may be arranged adjacent to each other in a processing line, and the flexible substrate is inserted into the first process module and may be ejected from the last process module of the line. Furthermore, the entire coating system may be re-configured if a change of individual processing operations is desired.

It is noted that while the particular substrate on which some implementations described herein may be practiced is not limited, it is particularly beneficial to practice the implementations on flexible substrates, including for example, web-based substrates, panels, and discrete sheets. The substrate may also be in the form of a foil, a film, or a thin plate.

It is also noted here that a flexible substrate or web as used within the implementations described herein can typically be characterized in that the flexible substrate is bendable. The term "web" may be synonymously used with the term "strip" or the term "flexible substrate." For example, the web as described in implementations herein may be a foil.

Energy storage devices, for example, batteries, typically include a positive electrode, a negative electrode separated by a porous separator and electrolyte, which is used as an ion-conductive matrix. Graphite anodes and silicon blended anodes are the current state of the art but these anode materials often suffer from irreversible capacity loss that occurs during the first cycle. Thus, there is a need for methods for replenishing this first cycle capacity loss.

Deposition of lithium metal or pre-lithiation is one such method for replenishing this first cycle capacity loss of anode materials. Direct pre-lithiation of anodes under vacuum ambient can be scaled for high volume manufacturing. However, particulates or contaminants attached to the electrode surface either physically, for example, by Van der Waals forces, or chemically bonded to the electrode surface can impede deposition of subsequent pre-lithiation layers. For example, these particulates can arise from humans, the environment in which the electrode is processed (e.g., particles generated by friction between moving objects within the processing chamber), as well as from films deposited or grown on the electrode structure. Some implementations involve activating a surface of the electrode for (a) a pre-treatment process to remove loosely held particles from the electrode surface; (b) a pre-treatment process to activate the surface of the electrode material for improved bonding or wetting for subsequently deposited materials; (c) a post-treatment of the pre-lithiation layer to improve subsequent bonding with additionally deposited layer, for example, passivation layers; and/or (d) a post-treatment of the pre-lithiation layer to improve/accelerate absorption of the lithium into the underlying electrode material.

In some implementations, direct pre-lithiation of lithium-ion battery anodes under vacuum ambient can be scaled for high volume manufacturing (HVM) and the implementations described herein provide the rolls in a roll-to-roll process for vacuum deposition of lithium by removing loosely held particles held on the surface of an electrode by Van Der Walls forces, surface activation of electrode materials, for example, carbon, graphite, Si/SiOx, and binder materials for increased bonding with subsequently deposited lithium for surface preparation for integration under HVM conditions.

In some implementations, integration of current slurry coating processes with next generation pre-lithiation applications is provided. The electrode materials can be enhanced by pre-lithiation and proper pretreatment and post-treatment processes. In addition, lithium inventory can be optimized for long cycle life and increased throughput.

In some implementations, pre-treatment of the electrode surface can be performed in atmosphere or vacuum conditions. The pre-treatment process can include a corona treatment process, an atmospheric plasma treatment process, a low energy plasma treatment process, a plasma treatment process performed in a vacuum environment, or a combination thereof. The pre-treatment process can be performed in an oxidizing or reducing atmosphere.

In some implementations, post-treatment is performed in controlled ambient including vacuum, wherein the post-treatment provides for easy handling of a pre-lithiated electrode in a high volume manufacturing environment and also improved device performance.

FIG. 1A illustrates an example lithium-ion energy storage device 100 having a lithium metal film formed on an electrode surface according to implementations of the present disclosure. The lithium-ion energy storage device 100 has a positive current collector 110, a positive electrode 120 or cathode, a separator 130, a negative electrode 140 or anode, a lithium metal film 145 or pre-lithiation film, with an optional surface protection film 170 formed thereon, and a negative current collector 150. The lithium-ion energy storage device can include a negative electrode structure 112 and a positive electrode structure 114 separated by the separator 130. The negative electrode structure 112 can include the negative electrode 140, the lithium metal film 145, with the optional surface protection film 170 formed thereon, and the negative current collector 150. The positive electrode structure 114 can include the positive current collector 110, the positive electrode 120, and optionally a lithium metal film or pre-lithiation film formed on the positive electrode 120. Note in FIG. 1 that the current collectors are shown to extend beyond the stack, although it is not necessary for the current collectors to extend beyond the stack, the portions extending beyond the stack may be used as tabs.

The current collectors 110, 150, on positive electrode 120 and negative electrode 140, respectively, can be identical or different electronic conductors. Examples of metals that the current collectors 110, 150 may be comprised of include aluminum (Al), copper (Cu), zinc (Zn), nickel (Ni), cobalt (Co), tin (Sn), silicon (Si), manganese (Mn), magnesium (Mg), alloys thereof, and combinations thereof. In one example, at least one of the current collectors 110, 150 is perforated. Furthermore, current collectors may be of any form factor (e.g., metallic foil, sheet, or plate), shape and micro/macro structure. Generally, in prismatic cells, tabs are formed of the same material as the current collector and may be formed during fabrication of the stack, or added later. All components except current collectors 110 and 150 can contain lithium-ion electrolytes.

The negative electrode 140 or anode may be any material compatible with the positive electrode 120. The negative electrode 140 may have an energy capacity greater than or equal to 372 mAh/g, preferably ≥700 mAh/g, and most preferably ≥1000 mAh/g. The negative electrode 140 may be constructed from carbon, graphite, silicon, silicon oxide, silicon-containing graphite, lithium, lithium metal foil, a lithium alloy foil (e.g. lithium aluminum alloys, lithium silver alloys, etc.), nickel, copper, silver, tin, indium, gallium, tin, bismuth, niobium, molybdenum, tungsten, chromium, titanium, lithium titanate, silicon, oxides thereof, composites thereof, or combinations thereof. The negative electrode 140 can be a composite anode including any of the aforementioned materials and a binder material. The composite anode can further include conductive materials, for example, carbon black or acetylene black, and optional solvents. In some implementations, the composite anode is made by mixing particles of the aforementioned materials in a slurry form with, for example, carbon black, a binder, and a solvent, to be casted using traditional slurry-based methods, for example, slot-die coating. The conductive additive can be selected from the group of graphite, graphene hard carbon, carbon black, carbon coated silicon, or a combination thereof. The binder material can be a carbon-based binder material. The binder material can be an inorganic binder material. The binding material can be selected from styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone (PVP), polyvinylpyridine, polyvinyl alcohol (PVA), polyvinyl acetate, polyepichlorohydrin, polyphosphazene (PPHOSs), polyacrylonitrile (PAN), polystyrene, latex, acrylic resins, phenolic resins, epoxy resins, carboxymethyl cellulose (CMC), hydroxypropyl cellulose (HPC), cellulose acetate, cellulose acetate butyrate, cellulose acetate propionate, cyanoethyl cellulose (CEC), cyanoethyl sucrose, polyester, polyamide, polyether, polyimide, polycarboxylate, polycarboxylic acid, polyacrylic acid (PAA), polyacrylate, polymethacrylic acid (PMAA), polymethacrylate, polyacrylamide, polyurethane, fluorinated polymer, chlorinated polymer, a salt of alginic acid, polyvinylidene fluoride (PVDF), poly(vinylidene fluoride)-hexafluoropropene, or a combination thereof. The solvent can be selected from N-methyl-2-pyrrolidone, dimethylformamide, dimethyl sulfoxide, acetonitrile, butylene carbonate, propylene carbonate, ethyl bromide, tetrahydrofuran, dimethyl carbonate, diethyl carbonate, ethyl methyl carbonate, methyl propyl carbonate, ethylene carbonate, water, pure water, de-ionized water, distilled water, ethanol, isopropanol, methanol, acetone, n-propanol, t-butanol, or a combination thereof.

The composite anode can be constructed using an atmospheric process. For example, a slot-die coating process. The composite anode can be constructed in a vacuum environment.

The surface(s) of a negative electrode, for example, negative electrode 140 can be treated using any of the pre-treatment processes described herein prior to subsequent deposition of any additional film, for example, the lithium metal film 145.

Figure 1B:
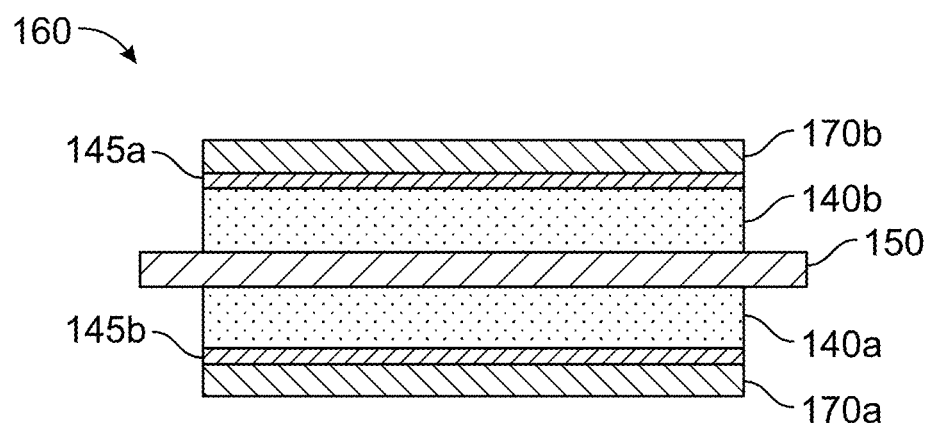
FIG. 1B illustrates a cross-sectional view of one example of a dual-sided electrode structure formed according to one or more implementations described herein.

In some implementations, the lithium metal film 145 or pre-lithiation film is formed on the negative electrode 140. The lithium metal film 145 may be formed according to the implementations described herein. In some implementations, the negative electrode 140 is a silicon graphite or graphite anode with the lithium metal film 145 formed thereon. The lithium metal film 145 replenishes lithium lost from first cycle capacity loss of the negative electrode 140. The lithium metal film 145 may be a thin lithium metal film (e.g., 20 microns or less, from about 1 micron to about 20 microns, from about 2 microns to about 10 microns). The lithium metal film 145 can be deposited using vapor deposition techniques. For example, the lithium metal film 145 can be deposited by thermal evaporation techniques or electron beam evaporation techniques. The lithium metal film 145 can be deposited in a vacuum environment. It should be understood that although the lithium metal film 145 is shown in FIG. 1A and FIG. 1B, in some implementations, the lithium metal film is either partially or completely intercalated into the electrode structure.

The surface(s) of the lithium metal film 145 and/or the negative electrode 140, for example, the negative electrode 140 can be treated using any of the post-treatment processes described herein prior to subsequent deposition of any additional films, for example, the surface protection film 170.

In some implementations, a surface protection film 170 is formed on the lithium metal film 145. The surface protection film 170 can be an ion-conducting polymer. The surface protection film 170 can be porous. In some implementations, the surface protection film 170 has nano-pores. In one implementation, the surface protection film 170 has a plurality of nano-pores that are sized to have an average pore size or diameter less than about 10 nanometers (e.g., from about 1 nanometer to about 10 nanometers; from about 3 nanometers to about 5 nanometers). In another implementation, the surface protection film 170 has a plurality of nano-pores that are sized to have an average pore size or diameter less than about 5 nanometers. In one implementation, the surface protection film 170 has a plurality of nano-pores having a diameter ranging from about 1 nanometer to about 20 nanometers (e.g., from about 2 nanometers to about 15 nanometers; or from about 5 nanometers to about 10 nanometers).

The surface protection film 170 may be a coating or a discrete layer, either having a thickness in the range of 1 nanometer to 2,000 nanometers (e.g., in the range of 10 nanometers to 600 nanometers; in the range of 50 nanometers to 200 nanometers; in the range of 100 nanometers to 150 nanometers). The surface protection film 170 may be a discrete membrane having a thickness in the range of 5 microns to 50 microns (e.g., in the range of 6 microns to 25 microns). In some implementations, where the surface protection film 170 is an interleaf film, the surface protection film 170 functions as a separator and takes the place of separator 130.

Examples of surface protection films that can be formed using the implementations described herein include but are not limited to at least one or more of a lithium carbonate film; a lithium fluoride (LiF) film; a dielectric or ceramic film (e.g., oxides of titanium (Ti), aluminum (Al), niobium (Nb), tantalum (Ta), zirconium (Zr), or a combination thereof); one or more metal film(s) (e.g., tin (Sn), antimony (Sb), bismuth (Bi), gallium (Ga), germanium (Ge), copper films, silver films, gold films, or a combination thereof); a copper chalcogenide film (e.g., $CuS$, $Cu_2Se$, $Cu_2S$); a bismuth chalcogenide film (e.g., $Bi_2Te_3$, $Bi_2Se_3$); a tin chalcogenide film (e.g., $SnTe$, $SnSe$, $SnSe_2$, $SnS$), a gallium chalcogenide film (e.g., $GaS$, $Ga_2S_3$, $GaSe$, $Ga_2Se_3$, $GaTe$), a germanium chalcogenide film ($GeTe$, $GeSe$, $GeS$), an indium chalcogenide film (e.g., $InS$, $In_6S_7$, $In_2S_3$, $InSe$, $InS_4Se_3$, $In_6Se_7$, $In_2Se_3$, $InTe$, $In_4Te_3$, $In_3Te_4$, $In_7Te_{10}$, $In_2Te_3$, $In_2Te_5$), a silver chalcogenide film ($Ag_2Se$, $Ag_2S$, $Ag_2Te$), boron nitride, lithium nitrate, lithium borohydride, and a combination thereof; and a carbon-containing film. In some examples, the one or more surface protection film(s) are ion-conducting films. The ion conducting film can be a lithium-ion conducting ceramic or a lithium-ion conducting glass. The lithium-ion conducting material may be comprised of one or more of LiPON, doped variants of either crystalline or amorphous phases of $Li_7La_3Zr_2O_{12}$, doped anti-perovskite compositions, $Li_2S$—$P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, and amorphous $xLiI-(1-x)Li_4SnS_4$) for example. In one implementation, x is between 0 and 1 (e.g., 0.1, 0.2, 0.3, 0.4, 0.5, 0.6, 0.7, 0.8, and 0.9). In some examples, the one or more surface protection film(s) are permeable to at least one of lithium ions and lithium atoms. The one or more surface protection film(s) 170 provide surface protection of the metal or metal alloy film, which allows for handling of the metal or metal alloy film in a dry room. The surface protection film 170 can be formed by any suitable techniques including but not limited to vapor deposition techniques, dip-coating, slot-die coating, spray, doctor blade, gravure coating, printing, or any of a number of coating methods. In some implementations, the lithium-ion conducting material can be directly deposited on the lithium metal film using either a Physical Vapor Deposition (PVD) or Chemical Vapor Deposition (CVD) technique.

The positive electrode 120 or cathode may be any material compatible with the anode and may include an intercalation compound, an insertion compound, or an electrochemically active polymer. Suitable intercalation materials include, for example, sulfur, lithium-containing metal oxides, $MoS_2$, $FeS_2$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiophene. The positive electrode 120 or cathode may be made from a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

In some implementations of a lithium-ion cell according to the present disclosure, lithium is contained in atomic layers of crystal structures of carbon graphite ($LiC_6$) at the negative electrode and lithium manganese oxide ($LiMnO_4$) or lithium cobalt oxide ($LiCoO_2$) at the positive electrode, for example, although in some implementations the negative electrode may also include lithium absorbing materials such as silicon, tin, etc. The cell, even though shown as a planar structure, may also be formed into a cylinder by reeling the stack of layers; furthermore, other cell configurations (e.g., prismatic cells, button cells) may be formed.

The surface(s) of a positive electrode, for example, the positive electrode 120 can be treated using any of the pre-treatment processes described herein prior to subsequent deposition of any additional film, for example, a lithium metal film, onto the surface of the positive electrode.

Electrolytes infused in cell components 120, 130, 140, 145 and 170 can be comprised of a liquid/gel or a solid polymer and may be different in each. In some implementations, the electrolyte primarily includes a salt and a medium (e.g., in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, MN) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF:chlorotrifluoroethylene) PAN (polyacrylonitrile), and PEO (polyethylene oxide).

FIG. 1B illustrates an example of a negative electrode cell 160 that may be combined with a positive electrode cell to form a lithium-ion energy storage device. The negative electrode cell 160 has a lithium metal film 145a, 145b with a surface protection film 170a, 170b formed thereon according to implementations of the present disclosure. The lithium metal film 145a, 145b may be a thin lithium metal film (e.g., 20 microns or less, from about 1 micron to about 20 microns, from about 2 microns to about 10 microns). The surface protection film 170a, 170b may be an interleaf film or ion-conducting polymer film as described herein. In some implementations where surface protection film 170a, 170b is an interleaf film, the interleaf film is typically removed prior to combining the negative electrode cell 160 with a positive electrode cell to form a lithium-ion storage device. In some implementations where surface protection film 170a, 170b is an ion-conducting polymer film, the ion-conducting polymer film is incorporated into the final battery structure.

The negative electrode cell 160 has a negative current collector 150, a negative electrode 140a, 140b formed on opposing sides of the negative current collector 150, lithium metal film 145a, 145b formed on the negative electrode 140a, 140b, and surface protection film 170a, 170b formed on the lithium metal film 145a, 145b. Although the negative electrode cell 160 is depicted as a dual-sided cell, it should be understood that the implementations described herein also apply to single-sided cells.

Figure 2:
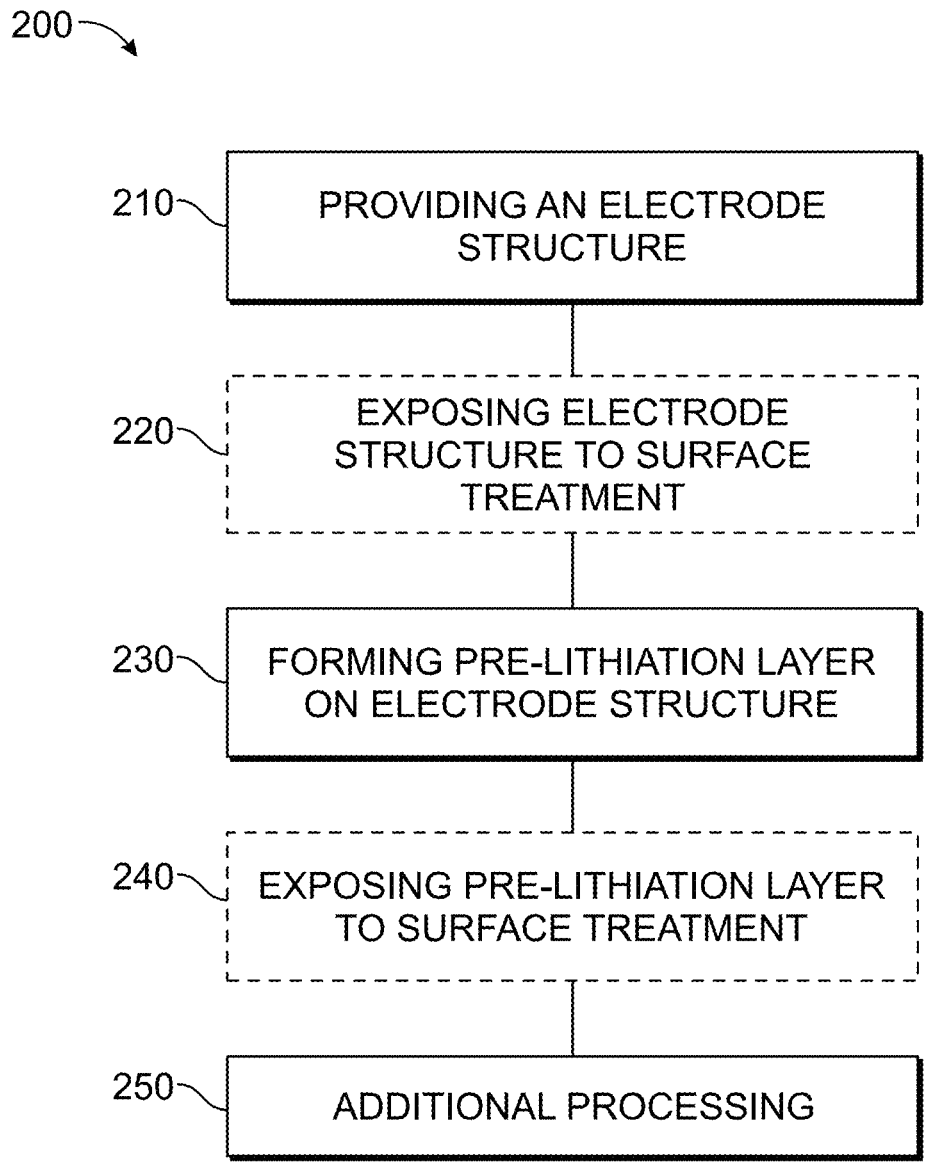
FIG. 2 illustrates a process flow chart of a method of forming an electrode structure according to one or more implementations described herein.

FIG. 2 illustrates a process flow chart of a method 200 of forming an electrode structure according to one or more implementations described herein. The electrode structure can be exposed to a pre-treatment process prior to deposition of additional layers on the electrode structure. The electrode structure can be exposed to a post-treatment process after deposition of additional layers on the electrode structure. The method 200 can be used for forming anode structures and cathode structures. The method 200 can be used to form portions of the lithium-ion energy storage device 100 and/or portions of the negative electrode cell 160 shown in FIGS. 1A and 1B respectively. The method 200 can be performed as part of a roll-to-roll process on a roll-to-roll tool.

At operation 210, an electrode structure is provided. The electrode structure can include at least a portion of the negative electrode structure 112 or the positive electrode structure 114. The electrode structure can include a negative electrode (e.g., anode film) or a positive electrode (e.g., cathode film), for example, positive electrode 120 or negative electrode 140. The electrode structure can have contaminants formed thereon. The contaminants can include, for example, particulates and organics. The contaminants can be charged. In some implementations where the electrode structure is a negative electrode, the negative electrode is a composite anode constructed from carbon, graphite, silicon, silicon oxide, silicon-containing graphite, lithium, nickel, copper, silver, tin, indium, silicon, oxides thereof, composites thereof, or combinations thereof. The negative electrode further includes a binder material. The negative electrode can further include conductive materials, for example, carbon black or acetylene black, and optional solvents. In some implementations, the composite anode is formed under atmospheric conditions. In one example, the composite anode is formed by mixing particles of the aforementioned materials in a slurry form with, for example, carbon black or acetylene black, a binder, and a solvent, to be casted using traditional slurry-based methods, for example, slot-die coating.

Optionally, at operation 220, the electrode structure is exposed to a surface treatment process. The surface treatment process can be performed to remove contaminants (if present) from the surface of the electrode structure to activate the surface of the electrode structure for better bonding or wetting by subsequently deposited material. The surface treatment process can be selected from a corona treatment process, an atmospheric plasma treatment process, a low energy plasma treatment process, a plasma treatment process performed in a vacuum environment, or a combination thereof.

The surface treatment process of operation 220 can be performed under atmospheric conditions, near atmospheric conditions, or vacuum conditions. In one example the surface treatment process can be carried out in a vacuum environment with an environment of $1 \times 10^{-2}$ mbar to about $1 \times 10^{-6}$ mbar (e.g., $1 \times 10^{-3}$ or below; $1 \times 10^{-4}$ or below).

The surface treatment of operation 220 can be a plasma treatment performed in an oxidizing gas environment, a reducing gas environment, or a combination of oxidizing and reducing gases. The plasma treatment process can be performed under atmospheric conditions, near atmospheric conditions, or vacuum conditions. The oxidizing environment can include one or more oxidizing gases. The one or more oxidizing gases can be selected from oxygen ($O_2$), ozone ($O_3$), nitrous oxide ($N_2O$), fluorine ($F_2$), chlorine ($Cl_2$), carbon monoxide (CO), carbon dioxide ($CO_2$), radicals thereof, derivatives thereof, or a combination thereof. In one implementation, the one or more oxidizing gases include oxygen ($O_2$). The one or more oxidizing gases can be introduced with one or more inert gases, such as nitrogen, helium or argon. The reducing environment can include one or more reducing gases. The reducing gases can be selected from ammonia ($NH_3$), hydrazine ($N_2H_4$), hydrogen ($H_2$), $NF_3$, atomic hydrogen, radicals thereof, derivatives thereof, or a combination thereof. In one example, the one or more reducing gases includes hydrogen. The one or more reducing gases can be introduced with one or more inert gases, such as nitrogen, helium or argon.

In some implementations, the surface treatment process is a plasma treatment process performed in a vacuum environment. The plasma treatment process can include exposing the electrode structure to a reducing plasma. The reducing plasma can be formed from a reducing gas mixture comprising ammonia ($NH_3$), hydrazine ($N_2H_4$), hydrogen ($H_2$), hydrogen halides, hydrogen chalcogenides, atomic hydrogen, radicals thereof, derivatives thereof, or a combination thereof. The reducing gas mixture can further include one or more inert gases. The reducing plasma can be a remotely formed plasma, a capacitively coupled plasma, or an inductively coupled plasma. The plasma treatment process can include exposing the electrode structure to an oxidizing plasma. The oxidizing plasma can be formed from an oxidizing gas mixture comprising oxygen ($O_2$), ozone ($O_3$), nitrous oxide ($N_2O$), fluorine ($F_2$), chlorine ($Cl_2$), carbon monoxide (CO), water ($H_2O$), carbon dioxide ($CO_2$), radicals thereof, derivatives thereof, or a combination thereof. The oxidizing gas mixture can further include one or more inert gases. The oxidizing plasma can be a remotely formed plasma, a capacitively coupled plasma, or an inductively coupled plasma.

The surface treatment of operation 220 can be a corona treatment (e.g., an air plasma treatment) used to modify the surface of the electrode structure. The corona treatment can be performed using a low temperature corona discharge plasma to impart changes to the surface energy of the electrode structure. The corona treatment discharge process includes generating an ionized corona discharge plasma. The generated corona discharge plasma can include a positive or negatively charged plasma.

Corona discharge usually involves two asymmetric electrodes positioned in a processing region; one highly curved, e.g., a needle tip or a small diameter wire, and one of low curvature, e.g., a plate, or a ground. The high curvature ensures a high potential around the electrode, providing for the generation of a plasma. If the geometry and gradient are such that the ionized region continues to grow instead of stopping at a certain radius, a completely conductive path may be formed, resulting in a momentary spark or a continuous arc.

In some implementations, the corona is positive. In other implementations, the corona is negative. This is determined by the polarity of the voltage on the highly-curved electrode. If the curved electrode is positive with respect to the flat electrode a positive corona exists; otherwise the corona is negative. In some implementations, the corona treatment is carried out in part under atmospheric or partial pressure, under vacuum, or a combination thereof.

In one example, the surface treatment of operation 220 is performed by exposing the electrode structure to an atmospheric plasma.

In some implementations, the surface treatment process performed at operation 220 includes supplying a treatment gas mixture into a processing region. A plasma is then formed from the treatment gas mixture to plasma treat the surface of the electrode structure to activate at least a portion of the electrode structure into an excited state, forming a treated electrode structure having a treated upper surface which may then enhance the nucleation/growth conditions of the subsequently deposited materials, for example, a pre-lithiation layer.

In one implementation, the treatment gas mixture includes at least one of oxygen-containing gas, an inert gas (e.g., argon, helium), or combinations thereof. The oxygen-containing gas supplied into the processing region can include at least one of oxygen ($O_2$), ozone ($O_3$), oxygen radicals (O*), ionized oxygen atoms, carbon dioxide ($CO_2$), nitric oxide ($NO_x$), water vapor, or combinations thereof. Other oxygen-containing gases may be used.

In one example of operation 220 involving oxidation, a gas source supplies oxygen gas ($O_2$) through a mass flow controller to an ozonator, which converts a large fraction of the oxygen to ozone gas ($O_3$). The resultant oxygen-based mixture of $O_2$ and $O_3$ and perhaps some oxygen radicals O* and ionized oxygen atoms or molecules is delivered into the processing region. The oxygen-based gas reacts within the processing region with the surface of the electrode structure, which can been heated to a predetermined, preferably low temperature. Ozone is a metastable molecule which spontaneously quickly dissociates in the reaction $O_3 \rightarrow O_2 + O^*$, where O* is a radical, which very quickly reacts with whatever available material can be oxidized. The ozonator may be implemented in a number of forms including capacitively or inductively coupled plasma or a UV lamp source.

At these high ozone concentrations, the electrode structure need not be heated very much to achieve relatively high oxidation rates. The high ozone concentration also allows the ozone partial pressure to be reduced. The high ozone fraction allows the ozone oxidation to be performed at pressures of less than 20 Torr. It should be understood that the aforementioned surface modification technique is exemplary and other surface modifications techniques that achieve the desired surface modification may also be used.

In some implementations, the surface treatment process includes a plasma treatment performed at or near atmospheric pressure. The atmospheric plasma can be comprised of a chemically non-reactive species, for example, argon or helium, and/or a chemically reactive species, for example, oxygen, nitrogen, or hydrogen.

In one implementation of the method disclosed herein, the atmospheric pressure plasma is formed from a plasma source gas, which is principally comprised of a chemically non-reactive species, for example, at least 95%, such as argon, or helium. One or more chemically reactive plasma source gases may be present, ranging in concentrations from about 0.005% to 5% of the plasma source gas. Chemically reactive plasma source gases which may be used include oxygen containing gases, for example, oxygen ($O_2$) and/or $CO_2$, which may be present in ranges from about 0.005% to 4.75%; and/or a reactive plasma source gas selected from the group of hydrogen ($H_2$), nitrogen trifluoride ($NF_3$), tetrafluoromethane ($CF_4$), ammonia ($NH_3$), silane ($SiH_4$), and combinations thereof, which may be present in ranges from about 0.005% to about 0.015%.

The spacing between an upper electrode and the electrode surface of the substrate is can be set to a range of from about 2 mm to about 15 mm, for example, about 3 mm. This selected spacing allows for generation of a very high energy density plasma at atmospheric pressure without plasma arcing. In one implementation of the present disclosure, the upper electrode is a gas diffuser, such as a conductive showerhead, which is used as both an electrode and a plasma source gas distribution manifold to evenly distribute gas into the plasma processing area. Alternatively, the showerhead may be a shape other than rectangular, and/or multiple smaller showerheads may be used instead of one large showerhead.

The atmospheric pressure plasma can be generated using an RF frequency power source. The frequency of the RF power source is typically about 13.56 MHz or about 27 MHz or about 54 MHz. The frequency of the RF power source is another variable in generating a very high energy density plasma source, without plasma arcing, at atmospheric pressure. One skilled in the art may select a different frequency depending on the particular processing apparatus used and the plasma source gas used, in view of the present disclosure.

In one example, the atmospheric plasma process includes a plasma source gas including a flow of 11 liters per minute of argon and 55 sccm of clean dry air (CDA), an RF frequency of 13.56 MHz, a power of 333 Watts, with a spacing of 3.0 millimeters between the plasma head and the electrode surface.

In some implementations, the surface treatment process includes a short plasma etch to activate the electrode surface. The atmospheric plasma can be comprised of a chemically non-reactive species, for example, argon or helium, and/or a chemically reactive species, for example, oxygen. To increase the external surface area of the electrode surface, a short plasma etch may be performed following the deposition of the electrode material.

In some implementations, the electrode surface can be etched using a low energy plasma treatment, such as 1 kV, with a dose ranging from 1E16 to 3E16 atoms per square centimeter implant. The etching gas could be $H_2$, $Cl_2$, $BCl_3$, HBr, $CF_4$, $CHF_3$, and other halogen-based compounds. In some implementations, the etching gas could also be a mixture of the above gases and argon and/or nitrogen to improve etching rate and tailor etching profile.

In one implementation, in order to create a hydrophilic surface having a large surface area, a mixture of $SiCl_4$ and $Cl_2$ plasmas is used. Chlorine is a commonly used etchant and serves to quickly remove a portion of the top layer of the electrode structure. The addition of $SiCl_4$ to the etching chemistry serves to produce $SiCl_x$ species on the electrode surfaces. Upon completion of the etching step, the electrode structure can then be exposed to heated water that is slightly basic (such as pH>8.0), which helps hydrolyze the $SiCl_x$ on the surface, making the portions of the electrode surface superhydrophilic. Silicon tetrachloride is in fact a byproduct of the silicon etching by chlorine, but its amount may not be sufficient to produce enough $SiCl_x$, thus requiring the addition of $SiCl_4$.

A bias can be applied to the electrode structure in the surface treatment process described herein and it may be in the range of 1-2 kV. Compared to a normal $Cl_2$ etching process, this bias can be slightly higher, such as between 2-4 kV, which serves to help the $SiCl_x$ and/or Cl ions penetrate into the electrode structure and to enhance ion implantation as compared to etching. It should be low enough, however, to not cause the chlorine functional groups to be buried deep under the substrate surface. In addition, lower process pressure, such as around 5 mTorr, can be used to reduce collisions within the sheath and improve the probability of generating high concentrations of $SiCl_x$ functionalities on the surface.

The short plasma etch provides an electrode structure with high surface kinetics, as well as maintaining a hydrophilic surface. Increasing the surface area drastically improves the performance of thin film electrodes by providing more active area for electrochemical reactions to take place. This may allow for faster charging and discharging of the battery. Hydrophilic properties may be desirable in order to provide more complete wetting of the electrolyte on the electrode. This may translate into more uniform lithium intercalation and increased rate capabilities.

After operation 220, the electrode having the treated surface can be transferred from an atmospheric environment, if operation 220 is performed in an atmospheric environment, into a vacuum environment for additional processing.

At operation 230, a pre-lithiation layer can be formed on the treated surface of the electrode structure. The pre-lithiation layer can be the lithium metal film 145 formed on the surface of a negative electrode, for example, the negative electrode 140. The pre-lithiation layer can be a lithium metal film formed on the surface of a positive electrode, for example, the positive electrode 120. In some implementations, the surface treatment process of operation 220 activates the surface of the electrode structure improving the wettability of the subsequently deposited pre-lithiation layer formed during operation 230. The pre-lithiation process of operation 230 can be performed in a vacuum environment. The lithium metal film replenishes lithium lost from first cycle capacity loss of the electrode structure. The lithium metal film can be a thin lithium metal film (e.g., 20 microns or less, from about 1 micron to about 20 microns, from about 2 microns to about 10 microns). The lithium metal film can be deposited using vapor deposition techniques. For example, the lithium metal film 145 can be deposited by PVD techniques, for example, thermal evaporation techniques or electron beam evaporation techniques.

Optionally, at operation 240, the pre-lithiation layer or pre-lithiated electrode structure is exposed to a post-treatment process. The post-treatment process can be a surface treatment process to activate the pre-lithiation layer, to accelerate the absorption of lithium into the underlying electrode structure, or a combination of both. The post-treatment process of operation 240 can be similar to any of the pre-treatment processes described in operation 220.

The post-treatment process of operation 240 can include a thermal treatment process or annealing process designed to accelerate the absorption of lithium from the pre-lithiation layer into the electrode structure. Examples of the post-treatment process include annealing in a vacuum environment, laser heating in a controlled ambient (e.g., argon or vacuum), exposure to thermal energy and/or radiation energy, adjusting pressure to accelerate absorption during the process, or a combination thereof. During operation 240, heat or thermal energy can be applied to the electrode structure, the pre-lithiation layer formed on the electrode structure, or both the pre-lithiation layer and the electrode structure.

The conditions of the post-treatment process of operation 240 can be selected such that the electrode structure and/or the pre-lithiation layer formed thereon is heated to a temperature below the melting point of the electrode structure but high enough to accelerate diffusion of lithium from the pre-lithiation layer into the electrode structure. The temperature of the post-treatment process of operation 240 can be within in a range from about room temperature (e.g., 22-24 degrees Celsius) to about 200 degrees Celsius. The temperature of the post-treatment process of operation 240 can be at or around room temperature. The temperature of the post-treatment process of operation 240 can be less than or equal to 180 degrees Celsius, for example, within a range from at or around room temperature to about 180 degrees Celsius. The temperature of the post-treatment process of operation 240 can be less than or equal to 150 degrees Celsius, for example, within a range from at or around room temperature to about 150 degrees Celsius. The temperature of the post-treatment process of operation 240 can be less than or equal to 130 degrees Celsius, for example, within a range from at or around room temperature to about 130 degrees Celsius. The temperature of the post-treatment process of operation 240 can be less than or equal to 80 degrees Celsius, for example, within a range from at or around room temperature to about 80 degrees Celsius. The temperature of the post-treatment process of operation 240 can be less than or equal to 60 degrees Celsius, for example, within a range from at or around room temperature to about 60 degrees Celsius. The electrode structure and/or the pre-lithiation layer can be heated to a temperature within a range from about room temperature to about 200 degrees Celsius, more narrowly within a range from about room temperature to about 180 degrees Celsius, more narrowly within a range from about 50 degrees Celsius to about 130 degrees Celsius, and more narrowly within a range from about 50 degrees Celsius to about 60 degrees Celsius.

For the vacuum annealing, the electrode structure (and hence the pre-lithiation layer deposited thereover) can be heated to an annealing temperature for a predetermined period of time. Any suitable annealing temperature can be used. The annealing temperature can be within in a range from about room temperature (e.g., 22-24 degrees Celsius) to about 200 degrees Celsius or any of the other ranges described with respect to operation 240. The vacuum annealing can occur for about 15 minutes to about 60 minutes. The vacuum annealing can occur for 5 minutes or more at ambient pressure. The vacuum annealing can occur in numerous environments. The vacuum annealing can occur in a vacuum environment. The vacuum annealing can occur in an inert gas environment, for example, argon, helium, neon, or a combination thereof. The vacuum annealing can occur in an environment of argon.

The post-treatment process of operation 240 can be performed under atmospheric conditions, near atmospheric conditions, or vacuum conditions. The surface treatment process can be carried out in a vacuum environment with an environment of $1\times10^{-2}$ mbar to about $1\times10^{-6}$ mbar (e.g., $1\times10^{-3}$ or below; $1\times10^{-4}$ or below). For some post-treatment vacuum processes, the pressure in the processing chamber during operation 240 can be below atmospheric pressure (e.g., 1013 mbar), for example, from about −2 mbar (e.g., −1500 mTorr) to about −25 mbar (e.g., −18751 mTorr). For some post-treatment processes performed at positive pressure, the pressure in the processing chamber during operation 240 can be performed within a range from about 10 mTorr to about 50 mTorr.

In one embodiment for the laser heating, the electrode structure (and hence the pre-lithiation layer deposited thereover) is exposed to radiant energy from a laser source to heat the electrode structure for a predetermined period of time. At least portions of the electrode structure can be annealed with the laser in a controlled ambient. The laser heating can occur in numerous environments. In one embodiment, the laser heating occurs in a vacuum environment. In another embodiment, the laser heating occurs in an inert gas environment. In another embodiment, the laser heating occurs in an environment of argon.

In one embodiment, for the thermal heating, the electrode structure (and hence the pre-lithiation layer deposited thereover) is exposed to radiant energy. Any suitable thermal heating temperature can be used. The thermal heating temperature can be within in a range from about room temperature (e.g., 22-24 degrees Celsius) to about 200 degrees Celsius or any of the other ranges described with respect to operation 240. The thermal heating can be performed by exposing the electrode structure to a heat source, for example, a lamp or heating assembly formed therein with an optional microwave generator coupled thereto. The microwave power applied during thermal/annealing process may gently heat/thermal process the electrode structure without adversely damaging the anode material or other film structures present in the electrode structure.

At operation 250, the pre-lithiated electrode structure can be exposed to additional processing. The additional processing can include forming additional films on the pre-lithiated electrode structure, for example, a surface protection film such as the surface protection film 170. In one example, the surface protection film is a lithium carbonate film formed by exposing the lithium metal film to a plasma formed from $CO_2$ gas. Prior activation of the lithium metal film using the post-treatment techniques can increase the speed at which the lithium carbonate film is formed and also improve the quality of the deposited lithium carbonate film.

Implementations of the present disclosure can include one or more of the following potential advantages. Some implementations involve activating a surface of the electrode for (a) a pre-treatment process to remove loosely held particles from the electrode surface; (b) a pre-treatment process to activate the surface of the electrode material for improved bonding or wetting for subsequently deposited materials; (c) a post-treatment of the pre-lithiation layer to improve subsequent bonding with additionally deposited layer, for example, passivation layers; and/or (d) a post-treatment of the pre-lithiation layer to improve/accelerate absorption of the lithium into the underlying electrode material. The pretreatment and post-treatment processes described herein can provide clean surfaces as well as activating surfaces for improved bonding or wetting for subsequently deposited materials. This can not only improve the speed at which subsequent films are deposited but also improves the quality of the deposited lithium carbonate film. In addition, current slurry coating processes can be integrated with next generation pre-lithiation applications using the processes described herein. In addition, lithium inventory can be optimized for long cycle life and increased throughput.

In some implementations, pre-treatment of the electrode surface can be performed in atmosphere or vacuum conditions. The pre-treatment process can include a corona treatment process, an atmospheric plasma treatment process, a low energy plasma treatment process, a plasma treatment process performed in a vacuum environment, or a combination thereof. The pre-treatment process can be performed in an oxidizing or reducing atmosphere.

In some implementations, post-treatment is performed in controlled ambient including vacuum, wherein the post-treatment provides for easy handling of a pre-lithiated electrode in a high volume manufacturing environment and also improved device performance. The post-treatment process can include a corona treatment process, an atmospheric plasma treatment process, a low energy plasma treatment process, a plasma treatment process performed in a vacuum environment, a thermal treatment process, an annealing process, or a combination thereof.

While there are numerous methods for lithium metal deposition (e.g., thermal evaporation, lamination, printing, etc.), handling of lithium metal deposited on a spool before device stacking needs to be addressed, especially in a high-volume manufacturing environment. In one implementation, methods and systems for forming an interleaf on the lithium metal film are provided. In another implementation, methods and systems for lithium polymer deposition are provided. In yet another implementation, an integrated tool for both lithium metal deposition and ion-conducting polymer deposition are provided.

EXAMPLES

The following non-limiting examples are provided to further illustrate implementations described herein. However, the examples are not intended to be all inclusive and are not intended to limit the scope of the implementations described herein. Table I depicts one example of surface treatment conditions using an atmospheric plasma according to one or more implementations described herein.

TABLE I

| | 200 mm wide web; 230 W power | | | |
| --- | --- | --- | --- | --- |
| | Cleaning | Cleaning | Reducing | Mild Oxidation |
| Ar | 8 L/min | 8 L/min | 8 L/min | 8 L/min |
| $O_2$ | 0.1 to 0.3% | | | |
| CDA | | 0.5 to 1% | | |
| $4\%H_2$—Ar | | | 12.5 to 25% | |
| $CO_2$ | | | | 0.3-0.5% |

Influence on Post-Absorption Process of Excess Lithium into Active Materials of Negative Battery Electrode.

After vacuum deposition of several microns of lithium metal on a negative battery electrode a certain amount of the deposited lithium is absorbed into the electrode layer. In this case the lithium either intercalates into the active material graphite or forms a Li—Si alloy with the silicon-containing compound in the battery electrode. It was observed that the negative electrode retains its black color in the areas with high percentage of absorption. Some amount of deposited metallic lithium, however, remains as film on the surface, referred to as 'excess lithium'. The excess lithium can be visually identified as a gray/white layer on the typically black negative battery electrode.

It was found that storage under inert gas atmosphere/vacuum (absence of nitrogen, oxygen and water) of a lithium-coated negative battery electrode leads to further absorption of metallic lithium into the active materials of the porous negative battery electrode material, referred to as a post-absorption process. Optically, it was observed that the gray/white layer of excess lithium decreases with time and a discoloration of the area to black takes place. This indicates that the lithium atoms can diffuse over time out of the metallic surface film into the active materials of the negative battery electrode.

In comparison, it was found that the post-absorption process could be suppressed by exposing the lithium-coated negative battery electrode to a carbon dioxide containing atmosphere directly after the lithium vacuum deposition process step. After treatment in a carbon dioxide containing atmosphere the areas of excess lithium showed no discoloration over time. The optical appearance of the gray/white layer did not change during storage under inert gas atmosphere/vacuum. This means the diffusion of lithium atoms into the active materials of the negative battery electrode is suppressed by the additional treatment. The gas treatment in a carbon dioxide containing atmosphere leads to the transformation of a certain amount of lithium metal to lithium carbonate. Since the gas is pervasive and can fully react with lithium in all active sites of the porous electrode matrix, the exact amount of transformed lithium depends on the porosity of the electrode layer, the roughness and thickness of the excess lithium film. Particularly the top atom layers of the excess lithium layer will start to react with carbon dioxide molecules, but the gas reaction can form a uniform carbonate layer with a thickness of more than 100 nm. Especially for negative battery electrodes with higher porosity the same amount of deposited lithium will be distributed over a higher electrode surface area. In this case the thickness of the excess lithium layer decreases and the conversion rate to lithium carbonate during the gas treatment increases.

Figure 3:
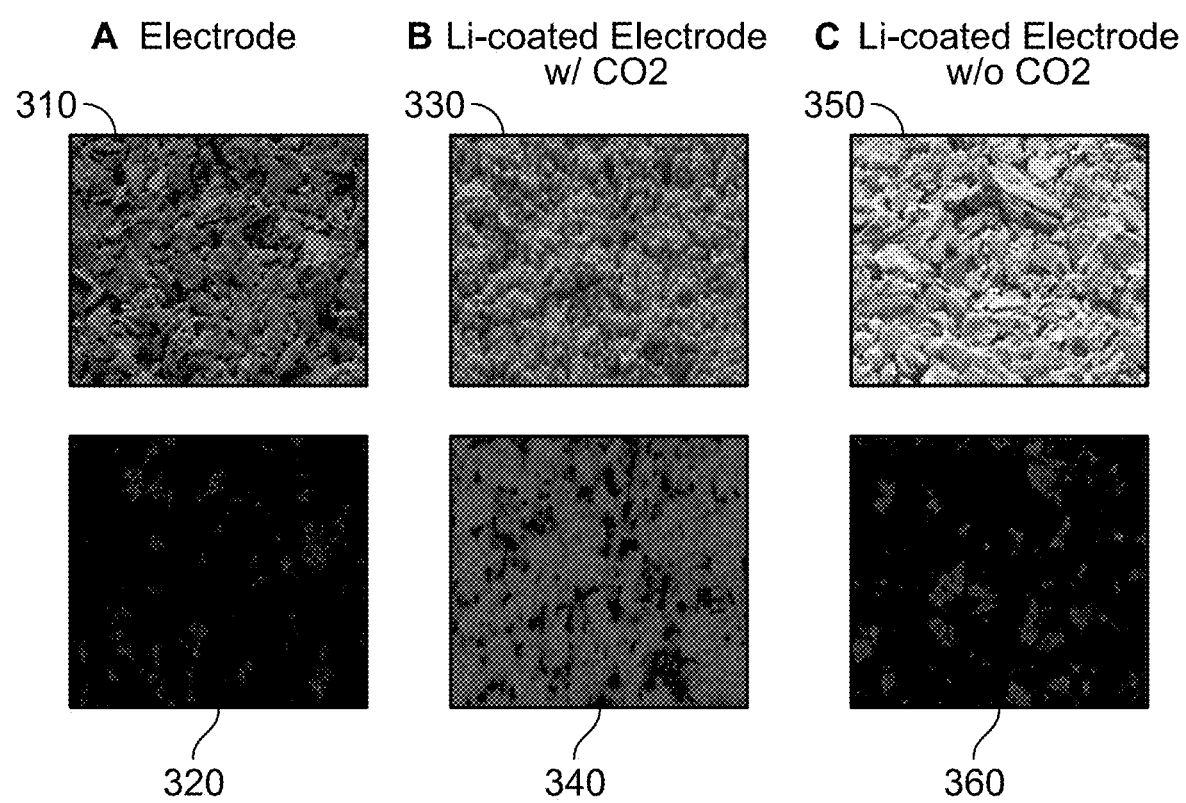
FIG. 3 illustrates SEM images showing morphology and EDX oxygen-signal for negative battery electrode materials formed according to one or more implementations described herein.

FIG. 3 illustrates SEM images 310-360 showing morphology and EDX oxygen-signal for negative battery electrode materials formed according to one or more implementations described herein. The SEM images depict examples of morphology and EDX oxygen-signal of A) a negative battery electrode material (images 310, 320); B) a lithium-coated electrode with treatment in carbon dioxide gas atmosphere after storage in vacuum/inert gas atmosphere (images 330, 340); and C) lithium-coated electrode without treatment in carbon dioxide gas atmosphere after storage in vacuum/inert gas atmosphere (images 350, 360). The oxygen signal intensity of both lithium-coated electrodes reflects the presence of lithium carbonate or other lithium.

In a comparative study negative battery electrode 1 and 2 were coated with the same amount of lithium and stored in vacuum/inert gas over the same time. Electrode 1 was treated in carbon dioxide gas atmosphere after the lithium deposition process, electrode 2 was not. SEM and EDX analysis proved that electrode 2 (w/o $CO_2$ treatment) showed no significant excess lithium layer after storage (similar to the pristine electrode shown in images 310, 320). On the surface of electrode 2 (images 330, 340) a high amount of oxygen was found that corresponds to a lithium carbonate layer. This observation provides further evidence that $CO_2$ treatment of the lithium-coated negative battery electrode suppresses further intercalation of lithium into the active materials of the electrode.

Storage of lithium-deposited negative battery electrode material in vacuum/inert gas before treatment in a carbon dioxide containing atmosphere can increase the degree of excess lithium post-absorption.

Implementations and all of the functional operations described in this specification can be implemented in digital electronic circuitry, or in computer software, firmware, or hardware, including the structural means disclosed in this specification and structural equivalents thereof, or in combinations of them. Implementations described herein can be implemented as one or more non-transitory computer program products, i.e., one or more computer programs tangibly embodied in a machine readable storage device, for execution by, or to control the operation of, data processing apparatus, e.g., a programmable processor, a computer, or multiple processors or computers.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. Processors suitable for the execution of a computer program include, by way of example, both general and special purpose microprocessors, and any one or more processors of any kind of digital computer.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the present disclosure further relate to any one or more of the following paragraphs:

1. A method of forming an electrode structure, comprising: exposing the electrode structure to a surface treatment process to activate a surface of the electrode structure; and forming a lithium metal film on the electrode structure, wherein the surface treatment process is selected from a corona treatment process, an atmospheric plasma treatment process, a low energy plasma treatment process, a plasma treatment process performed in a vacuum environment, or a combination thereof.
2. The method of paragraph 1, wherein the surface treatment process is the corona treatment process.
3. The method of paragraph 2, wherein the corona treatment process comprises generating an ionized corona discharge plasma.
4. The method of paragraph 3, wherein the generated ionized corona discharge plasma comprises a positive or negatively charged plasma.
5. The method of paragraph 1, wherein the surface treatment process is the atmospheric plasma treatment process.
6. The method of paragraph 5, wherein the atmospheric plasma treatment process is performed at or near atmospheric pressure.
7. The method of paragraph 5, wherein the atmospheric plasma treatment process comprises a plasma source gas comprising a chemically reactive species and a chemically non-reactive species.
8. The method of paragraph 7, wherein the chemically reactive species is selected from oxygen, nitrogen, hydrogen, or a combination thereof.
9. The method of paragraph 8, wherein the chemically non-reactive species is selected from argon, helium, or a combination thereof.
10. The method of paragraph 9, wherein the plasma source gas comprises a concentration of at least 95% of the chemically non-reactive species and a concentration of the chemically reactive species of less than 5%.
11. The method of paragraph 7, wherein the chemically reactive species is oxygen and the chemically non-reactive species is argon.
12. The method of paragraph 7, wherein the chemically reactive species is hydrogen and the chemically non-reactive species is argon.
13. The method of paragraph 7, wherein the atmospheric plasma treatment process comprises generating an atmospheric pressure plasma using an RF frequency power source.
14. The method of paragraph 13, wherein the RF frequency power source is from about 13.56 MHz to about 27 MHz.
15. The method of paragraph 1, wherein the surface treatment process is the plasma treatment process performed in a vacuum environment.

16. The method of paragraph 15, wherein the plasma treatment process comprises exposing the electrode structure to a reducing plasma.

17. The method of paragraph 16, wherein the reducing plasma is formed from a reducing gas mixture comprising ammonia ($NH_3$), hydrazine ($N_2H_4$), hydrogen ($H_2$), hydrogen halides, hydrogen chalcogenides, atomic hydrogen, radicals thereof, derivatives thereof, or a combination thereof.

18. The method of paragraph 17, wherein the reducing gas mixture further comprises one or more inert gases.

19. The method of paragraph 17, wherein the reducing plasma is a remotely formed plasma, a capacitively coupled plasma, or an inductively coupled plasma.

20. The method of paragraph 15, wherein the plasma treatment process comprises exposing the electrode structure to an oxidizing plasma.

21. The method of paragraph 20, wherein the oxidizing plasma is formed from an oxidizing gas mixture comprising oxygen (O2), ozone (O3), nitrous oxide (N2O), fluorine (F2), chlorine (Cl2), carbon monoxide (CO), water ($H_2O$), carbon dioxide (CO2), radicals thereof, derivatives thereof, or a combination thereof.

22. The method of paragraph 21, wherein the oxidizing gas mixture further comprises one or more inert gases.

23. The method of paragraph 21, wherein the oxidizing plasma is a remotely formed plasma, a capacitively coupled plasma, or an inductively coupled plasma.

24. The method of any of paragraphs 1 to 23, wherein the electrode structure comprises a composite anode comprising at least one of carbon, graphite, silicon, silicon oxide, silicon-containing graphite, lithium, lithium metal foil or a lithium alloy foil (e.g. lithium aluminum alloys), nickel, copper, silver, tin, indium, silicon, oxides thereof, composites thereof, or combinations thereof and a binder material.

25. The method of any of paragraphs 1 to 24, wherein the electrode structure further comprises a continuous flexible substrate.

26. The method of any of paragraphs 1 to 25, wherein the surface treatment process is performed in a roll-to-roll tool.

27. The method of any of paragraphs 1 to 26, further comprising exposing the lithium metal film to $CO_2$ gas to form a passivation layer.

28. The method of any of paragraphs 1 to 27, further comprising exposing the lithium metal film to a post-deposition surface treatment process, wherein the post-deposition surface treatment process comprise annealing the lithium metal film in a vacuum environment, heating the lithium metal film with a laser in a controlled ambient (e.g., argon or vacuum), exposing the lithium metal film to thermal energy and/or radiation energy, or a combination thereof.

29. A method of forming an electrode structure, comprising: forming an anode structure in an atmospheric environment; exposing the anode structure to a surface treatment process to activate a surface of the electrode structure; and forming a lithium metal film on the electrode structure in a vacuum environment, wherein the surface treatment process is selected from a corona treatment process, an atmospheric plasma treatment process, a low energy plasma treatment process, a plasma treatment process performed in a vacuum environment, or a combination thereof.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A method of forming a negative electrode structure, comprising:
   exposing a negative electrode to a surface treatment process to activate a surface of the negative electrode, wherein the negative electrode comprises carbon, graphite, silicon, silicon oxide, or a combination thereof and the surface treatment process is selected from a corona treatment process, an atmospheric plasma treatment process, a low energy plasma treatment process, a plasma treatment process performed in a vacuum environment, or a combination thereof;
   forming a lithium metal film on the surface of the negative electrode; and
   exposing the lithium metal film to a post-deposition surface treatment process to accelerate absorption of the lithium metal film into the negative electrode to pre-lithiate the negative electrode, wherein the post-deposition surface treatment process comprises heating the lithium metal film with a laser in a controlled ambient, and optionally exposing the lithium metal film to thermal energy, annealing the lithium metal film in a vacuum environment, or a combination thereof.

2. The method of claim 1, wherein the surface treatment process is the corona treatment process and the corona treatment process comprises generating an ionized corona discharge plasma.

3. The method of claim 2, wherein the ionized corona discharge plasma comprises a positive or negatively charged plasma.

4. The method of claim 1, wherein the surface treatment process is the atmospheric plasma treatment process and the atmospheric plasma treatment process is performed at or near atmospheric pressure.

5. The method of claim 4, wherein the atmospheric plasma treatment process comprises a plasma source gas comprising a chemically reactive species and a chemically non-reactive species, wherein:
   the chemically reactive species is selected from oxygen, nitrogen, hydrogen, or a combination thereof; and
   the chemically non-reactive species is selected from argon, helium, or a combination thereof.

6. The method of claim 5, wherein the plasma source gas comprises a concentration of at least 95% of the chemically non-reactive species and a concentration of the chemically reactive species of less than 5%.

7. The method of claim 5, wherein the chemically reactive species is oxygen, nitrogen, or hydrogen and the chemically non-reactive species is argon.

8. The method of claim 5, wherein the atmospheric plasma treatment process comprises generating an atmospheric pressure plasma using an RF frequency power source, wherein the RF frequency power source is from about 13.56 MHz to about 27 MHz.

9. The method of claim 1, wherein the surface treatment process is the plasma treatment process performed in a vacuum environment.

10. The method of claim 9, wherein the plasma treatment process comprises exposing the negative electrode to a reducing plasma.

11. The method of claim 10, wherein the reducing plasma is formed from a reducing gas mixture comprising ammonia ($NH_3$), hydrazine ($N_2H_4$), hydrogen ($H_2$), atomic hydrogen, hydrogen halides, hydrogen chalcogenides, radicals thereof, derivatives thereof, or a combination thereof.

12. The method of claim 11, wherein the reducing gas mixture further comprises one or more inert gases and the reducing plasma is a remotely formed plasma, a capacitively coupled plasma, or an inductively coupled plasma.

13. The method of claim 9, wherein the plasma treatment process comprises exposing the negative electrode to an oxidizing plasma.

14. The method of claim 13, wherein the oxidizing plasma is formed from an oxidizing gas mixture comprises oxygen ($O_2$), ozone ($O_3$), nitrous oxide ($N_2O$), fluorine ($F_2$), chlorine ($Cl_2$), carbon monoxide (CO), carbon dioxide ($CO_2$), water ($H_2O$), radicals thereof, derivatives thereof, or a combination thereof.

15. The method of claim 13, wherein the oxidizing plasma is a remotely formed plasma, a capacitively coupled plasma, or an inductively coupled plasma.

16. A method of forming a negative electrode structure, comprising:
forming a negative electrode in an atmospheric environment, wherein the negative electrode comprises carbon, graphite, silicon, silicon oxide, or a combination thereof;
exposing the negative electrode to a surface treatment process to activate a surface of the negative electrode, wherein the surface treatment process is selected from a corona treatment process, an atmospheric plasma treatment process, a low energy plasma treatment process, a plasma treatment process performed in a vacuum environment, or a combination thereof;
forming a lithium metal film on the surface of the negative electrode in a vacuum environment; and
exposing the lithium metal film to a post-deposition surface treatment process to accelerate absorption of the lithium metal film into the negative electrode to pre-lithiate the negative electrode, wherein the post-deposition surface treatment process comprises heating the lithium metal film with a laser in a controlled ambient, and optionally exposing the lithium metal film to thermal energy, annealing the lithium metal film in a vacuum environment, or a combination thereof.

17. The method of claim 16, wherein the surface treatment process is the corona treatment process and the corona treatment process comprises generating an ionized corona discharge plasma.

18. The method of claim 16, wherein the surface treatment process is the atmospheric plasma treatment process and the atmospheric plasma treatment process is performed at or near atmospheric pressure.

19. The method of claim 16, wherein the surface treatment process is the plasma treatment process performed in a vacuum environment.

20. The method of claim 16, wherein forming the negative electrode in the atmospheric environment comprises a slurry coating process.

* * * * *